A. O. BISHOP.
STREET SWEEPER.
APPLICATION FILED JUNE 7, 1918.
1,307,180.
Patented June 17, 1919.
2 SHEETS—SHEET 1.
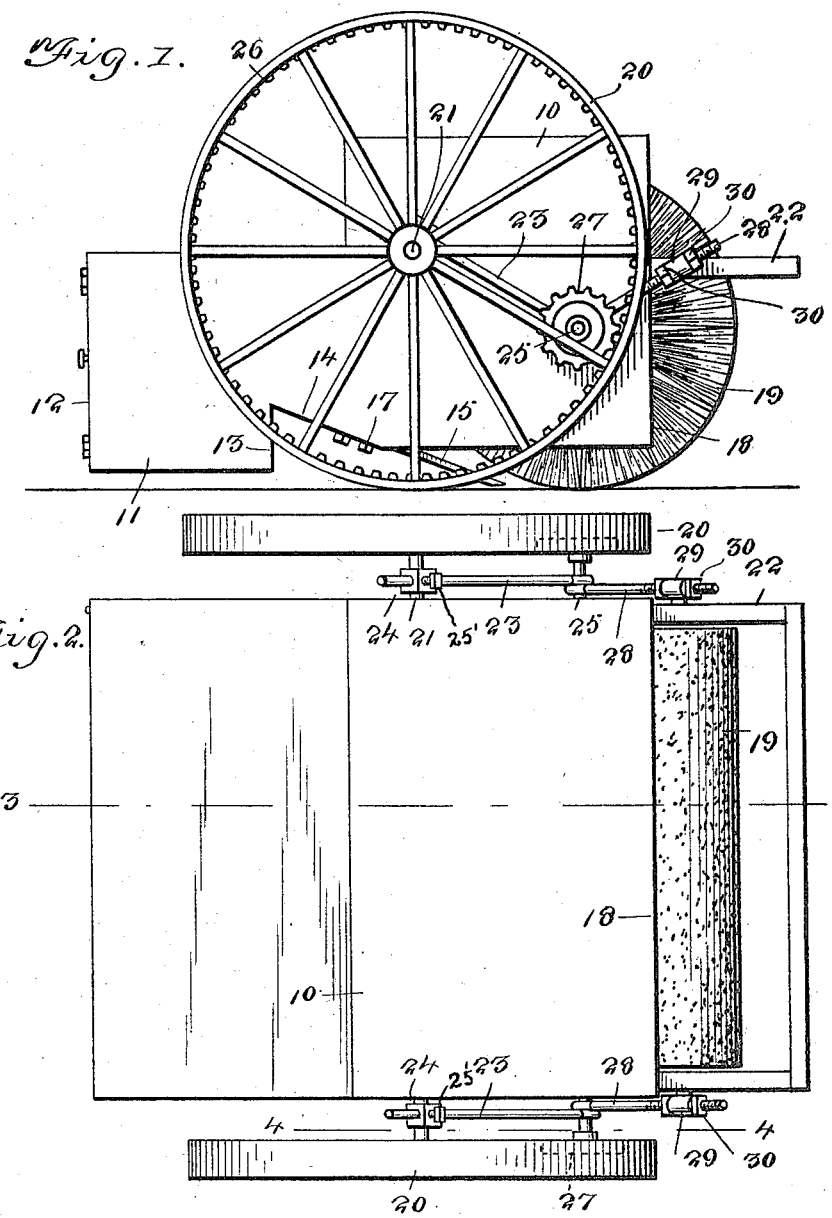
WITNESSES
E. R. Ruppert.
INVENTOR
A. O. Bishop
BY Victor J. Evans
ATTORNEY A. O. BISHOP.
STREET SWEEPER.
APPLICATION FILED JUNE 7, 1918.
1,307,180.
Patented June 17, 1919.
2 SHEETS—SHEET 2.
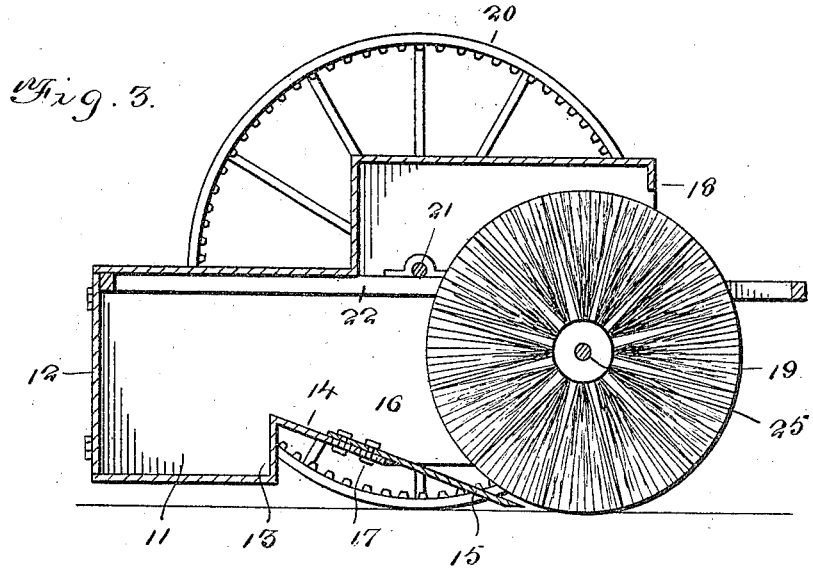
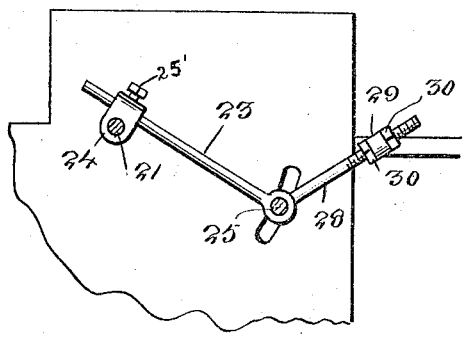
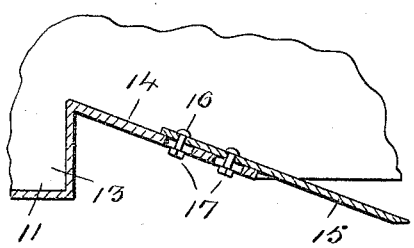
WITNESSES
E. Q. Ruppert.
INVENTOR
A. O. Bishop
BY Victor J. Evans
ATTORNEY

UNITED STATES PATENT OFFICE.

ARTHUR O. BISHOP, OF POTTSVILLE, PENNSYLVANIA.

STREET-SWEEPER.

1,307,180.

Specification of Letters Patent.  Patented June 17, 1919.

Application filed June 7, 1918.  Serial No. 238,764.

*To all whom it may concern:*

Be it known that I, ARTHUR O. BISHOP, a citizen of the United States, residing at Pottsville, in the county of Schuylkill and State of Pennsylvania, have invented new and useful Improvements in Street-Sweepers, of which the following is a specification.

This invention relates to a street sweeping device.

In carrying out my invention it is my purpose to produce a street sweeping device in which the brush may be adjusted with respect to the ground surface so that wear on said brush may be thus compensated for.

It is also my purpose to produce a device of this character which shall be of an extremely simple nature, and in which the receiving plate for the dust and dirt is adjustable with respect to the brush.

It is a further object of the invention to produce a device of this character which shall be practically dustless and which may be easily operated.

Other objects and advantages will appear as the nature of the invention is better understood, reference being had to the accompanying drawings, in which, Figure 1 is a side elevation of the improvement.

Fig. 2 is a top plan view of the same.

Fig. 3 is a sectional view approximately on the line 3—3 of Fig. 2.

Fig. 4 is a sectional view approximately on the line 4—4 of Fig. 2.

Fig. 5 is a detail enlarged sectional view approximately on the line 5—5 of Fig. 1.

As disclosed by the drawings I provide a suitable casing 10 which, in the construction illustrated by the drawings is of a greater height at its forward end than at its rear end. The rear end of the casing 10 provides the dust receptacle, which is indicated by the numeral 11, the same being normally closed by a hinged door 12 which is latched or otherwise connected to the receptacle proper to provide a dust tight joint therebetween. The front face of the receptacle 10 is vertically straight as at 13, and from the upper edge of the said straight surface the outer bottom wall of the receptacle is arranged at a downward angle as indicated by the numeral 14. This wall provides the mouth of the dust receptacle, and on the said mouth is arranged an apron plate 15 which is longitudinally adjustable on the inclined surface 14. The adjustment between the apron and the mouth of the dust receptacle is accomplished preferably by providing the inclined lower wall 14 with spaced elongated openings which are, however, always closed by the apron 15, and the apron 15 is provided with depending bolts 16 that pass through the said openings, while nuts 17 engage the said bolts and contact with the outer face of the inclined wall 14.

The apron 15, it will be noted terminates a suitable distance away from the forward end 18 of the casing 10, so that the bottom of the casing is open at this point. The front 18 of the casing 10 may be likewise provided with an opening through which the forward end of a rotary brush 19 projects, but, it is to be understood, that the brush may be wholly concealed in the casing if desired.

The ground wheels are indicated by the numerals 20 and are journaled on a suitable shaft 21 that rests upon a beam or beams 22 arranged at the upper edge of the dust receptacle 11 and projecting a suitable distance forward of the casing 10, and to these beams the draft animals may be attached. On the shaft 21, inward of the wheels thereof, but outward of the casing are loosely arranged blocks 24. Each of the blocks has an opening through which the shaft 21 passes, and is further provided with a transverse opening that receives therethrough a bar 23. The numeral 25' designates a binding screw for adjustably retaining the bar in the block. Each of the bars 23 has one of its ends enlarged and provided with a round opening for forming a bearing for the shaft or trunnion 25 of the brush 19. The bars 23 are in the nature of brace members.

Each of the ground wheels 20 has its inner periphery provided with teeth 26 and these teeth mesh with pinions 27 keyed on the shafts or trunnions 25 of the brush 19.

In addition to the brace bars 23 the brush 19 is supported by bars 28, the latter having their inner ends journaled on the shafts or trunnions 25 of the brush and being disposed at an outward angle so as to contact with the outer sides of the beams 22. The bars 28 pass through openings provided in brackets 29 secured to the beams 22, the said bars being threaded and being engaged by nuts 30 which contact with the brackets. By adjusting the nuts 30 the bars may be moved longitudinally, thus bringing the brush toward the beams or toward the ground surface, the pinions traveling over the teeth 26 of the ground wheels during such adjustment. As the brush is arranged between the sides of the casing and the bars 23 and 28 outward of the casing, the shafts or trunnions 25 for the brush pass through elongated slots in the sides of the casing, as disclosed in Fig. 4 of the drawings, the said slots being arranged concentric with respect to the center of the openings in the casing through which the shaft 21 passes.

It is believed, from the foregoing description that the simplicity and advantages of the construction will be apparent without further detailed description.

Having thus described the invention, what I claim is:

A street sweeper including a casing, a shaft passing transversely therethrough, ground wheels having inner toothed peripheries journaled on said shaft, a rotary brush in the casing having trunnions passing through slots in the sides of the casing, and toothed wheels on said trunnions meshing with the teeth of the wheels, a block loosely mounted on the shaft at the opposite sides of the casing, a bar passing through each of said blocks and loosely connected with the trunnions of the brush, binding means between the blocks and bars, other bars also loosely arranged upon the trunnions, brackets through which said last mentioned bars pass, and adjustable supporting means on said last mentioned bars contacting with the brackets to lock said bars thereon and hold said brush adjusted with respect to the frame.

In testimony whereof I affix my signature.

ARTHUR O. BISHOP.

Copies of this patent may be obtained for five cents each, by addressing the "Commissioner of Patents, Washington, D. C."